DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED OCTOBER 28, 1969

867 O.G. 1095

T0881017

827,844

METHOD OF MOLDING ARTICLES USING MOLDING COMPOSITIONS CONTAINING DISPERSED PARTICULATE ADDITIVES

William L. Johnson and Ben T. Pardue, both of P.O. Box 511, Kingsport, Tenn. 37662

Filed May 26, 1969. Published Oct. 28, 1969

Int. Cl. B29f *1/022*

U.S. Cl. 264—328

1 Sheet Drawing. 7 Pages Specification

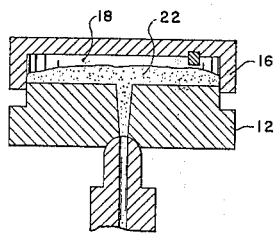

A method of molding articles from molding compositions containing dispersed particulate additives therein. The additive may comprise fine particles of a metallic pigment which is used for coloration and ornamentation. A charge of the melt is injected into a mold cavity maintained at a greater volume than the volume of the article to be molded. Upon completion of the injection of the charge, the mold cavity is closed, or the volume is decreased, to the size and shape corresponding to that of the article to be molded. This process results in substantially uniform dispersions of the additive particles in the molded article.